(12) United States Patent
Wang et al.

(10) Patent No.: US 8,929,334 B2
(45) Date of Patent: Jan. 6, 2015

(54) SYSTEMS AND METHODS FOR NON-OPTIMIZED HANDOFF

(75) Inventors: Jun Wang, San Diego, CA (US);
George Cherian, San Diego, CA (US);
Xipeng Zhu, Beijing (CN); Srinivasan Balasubramanian, San Diego, CA (US);
Anand Palanigounder, San Diego, CA (US); Ajith Tom Payyappilly, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 246 days.

(21) Appl. No.: 13/297,196

(22) Filed: Nov. 15, 2011

(65) Prior Publication Data

US 2012/0188980 A1  Jul. 26, 2012

Related U.S. Application Data

(60) Provisional application No. 61/414,365, filed on Nov. 16, 2010, provisional application No. 61/440,382, filed on Feb. 7, 2011.

(51) Int. Cl.
| | |
|---|---|
| *H04W 4/00* | (2009.01) |
| *H04W 36/00* | (2009.01) |
| H04W 36/14 | (2009.01) |
| H04W 36/18 | (2009.01) |

(52) U.S. Cl.
CPC .......... *H04W 36/0033* (2013.01); *H04W 36/14* (2013.01); *H04W 36/18* (2013.01)
USPC ........................................................ 370/331

(58) Field of Classification Search
None
See application file for complete search history.

(56) References Cited

U.S. PATENT DOCUMENTS

| | | | |
|---|---|---|---|
| 8,190,158 B2 * | 5/2012 | Yang et al. .................... | 455/436 |
| 2005/0025164 A1 | 2/2005 | Kavanagh et al. | |

(Continued)

FOREIGN PATENT DOCUMENTS

| | | |
|---|---|---|
| JP | 2010534999 A | 11/2010 |
| JP | 2010539838 A | 12/2010 |

(Continued)

OTHER PUBLICATIONS

International Search Report and Written Opinion—PCT/US2011/061069—ISA/EPO—Jan. 30, 2012.

(Continued)

*Primary Examiner* — Minh-Trang Nguyen
(74) *Attorney, Agent, or Firm* — Abdollah Katbab

(57) ABSTRACT

Systems, methods and apparatus for non-optimized handoffs for wireless communication are provided. For example, the disclosure may be applied to enhance non-optimized handoff from a long-term evolution (LTE) network to an evolved high rate packet data (eHRPD) network. Systems, methods, and apparatus for reducing the interruption gap during handoffs from an LTE radio access network to an eHRPD network are also discussed. In one aspect, a method is provided for communicating information associated with a handoff of a wireless device from a source network to a target network. The method includes, during a period of data inactivity, attaching to a first network and creating a context therewith, the first network being a non-preferred network as compared to a second network. The method also include connecting to the second network based on the context created with the first network and while maintaining at least a partial context with the first network.

32 Claims, 13 Drawing Sheets

(56) References Cited

U.S. PATENT DOCUMENTS

| | | |
|---|---|---|
| 2006/0251022 A1 | 11/2006 | Zhang et al. |
| 2006/0258356 A1 | 11/2006 | Maxwell et al. |
| 2008/0089293 A1 | 4/2008 | Madour et al. |
| 2010/0322163 A1 | 12/2010 | Bhalla et al. |
| 2011/0051683 A1 | 3/2011 | Ramankutty et al. |
| 2011/0092213 A1 | 4/2011 | Forsberg et al. |
| 2011/0142239 A1 | 6/2011 | Suh et al. |
| 2011/0182268 A1* | 7/2011 | Akhtar .................. 370/331 |
| 2011/0213897 A1 | 9/2011 | Zhao et al. |
| 2012/0127956 A1 | 5/2012 | Wang et al. |

FOREIGN PATENT DOCUMENTS

| | | |
|---|---|---|
| WO | WO2005008964 A1 | 1/2005 |
| WO | WO2005027558 A1 | 3/2005 |
| WO | WO2008020280 A1 | 2/2008 |
| WO | WO2008044215 A2 | 4/2008 |
| WO | 2009037623 A2 | 3/2009 |
| WO | WO2009135931 A1 | 11/2009 |
| WO | 2009154640 A2 | 12/2009 |

OTHER PUBLICATIONS

Taiwan Search Report—TW100141906—TIPO—Feb. 16, 2014.

* cited by examiner

SYSTEMS AND METHODS FOR NON-OPTIMIZED HANDOFF

CROSS-REFERENCE TO RELATED APPLICATIONS

This application claims priority from U.S. Provisional Patent Application No. 61/414,365, entitled "APPARATUS AND METHOD FOR ENHANCED NON OPTIMIZED HANDOVER," filed Nov. 16, 2010, which is incorporated by reference in its entirety. This application also claims priority from U.S. Provisional Patent Application No. 61/440,382, entitled "IMPROVED NON-OPTIMIZED HANDOFF FROM A FIRST NETWORK TO A SECOND NETWORK," filed Feb. 7, 2011, which is incorporated by reference in its entirety.

BACKGROUND

1. Field

The present application relates generally to communications, and more specifically to handoffs from a long-term evolution (LTE) network to an evolved high rate packet data (eHRPD) network.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an implementation of a method of handoff in a wireless communication system. The method includes, during a period of data inactivity, attaching to a first network and creating a context therewith, the first network being a non-preferred network as compared to a second network. The method also include connecting to the second network based on the context created with the first network and while maintaining at least a partial context with the first network. The method may include switching from the first network to the second network, for example, switching from a long term evolution radio access technology to an evolved high rate packet data radio access technology. The switching may include recovering the original context.

In some implementations, recovering the original context includes transmitting a request to establish a connection to a packet data network to the first network using a signaling channel. Recovery may also include establishing a traffic channel on the first network. In some implementations, the request to establish a connection to the packet data network is transmitted before the traffic channel has been established. The source network may be a network configured to use a long term evolution radio access technology and the source network may be configured to use an evolved high rate packet data radio access technology.

Another aspect of the subject matter described in the disclosure provides a wireless communication apparatus operative in a communication network. The apparatus includes a processor. The processor is configured to, during a period of data inactivity, attach to a first network and creating a context therewith, the first network being a non-preferred network as compared to a second network. The processor is further configured to connect to the second network based on the context created with the first network and while maintaining at least a partial context with the first network. The processor may be configured to transmit a request to establish a connection to a packet data network to a target network using a signaling channel.

Yet another aspect of the subject matter described in the disclosure provides a wireless communication apparatus operative in a communication network. The apparatus includes means for, during a period of data inactivity, attaching to a first network and creating a context therewith, the first network being a non-preferred network as compared to a second network. The apparatus also includes means for connecting to the second network based on the context created with the first network and while maintaining at least a partial context with the first network.

Another aspect of the subject matter described in the disclosure provides a computer program product, comprising a computer-readable medium. The computer-readable medium includes code for causing a computer to, during a period of data inactivity, attach to a first network and creating a context therewith, the first network being a non-preferred network as compared to a second network. The computer-readable medium also includes code for connecting to the second network based on the context created with the first network and while maintaining at least a partial context with the first network.

Figure 1:
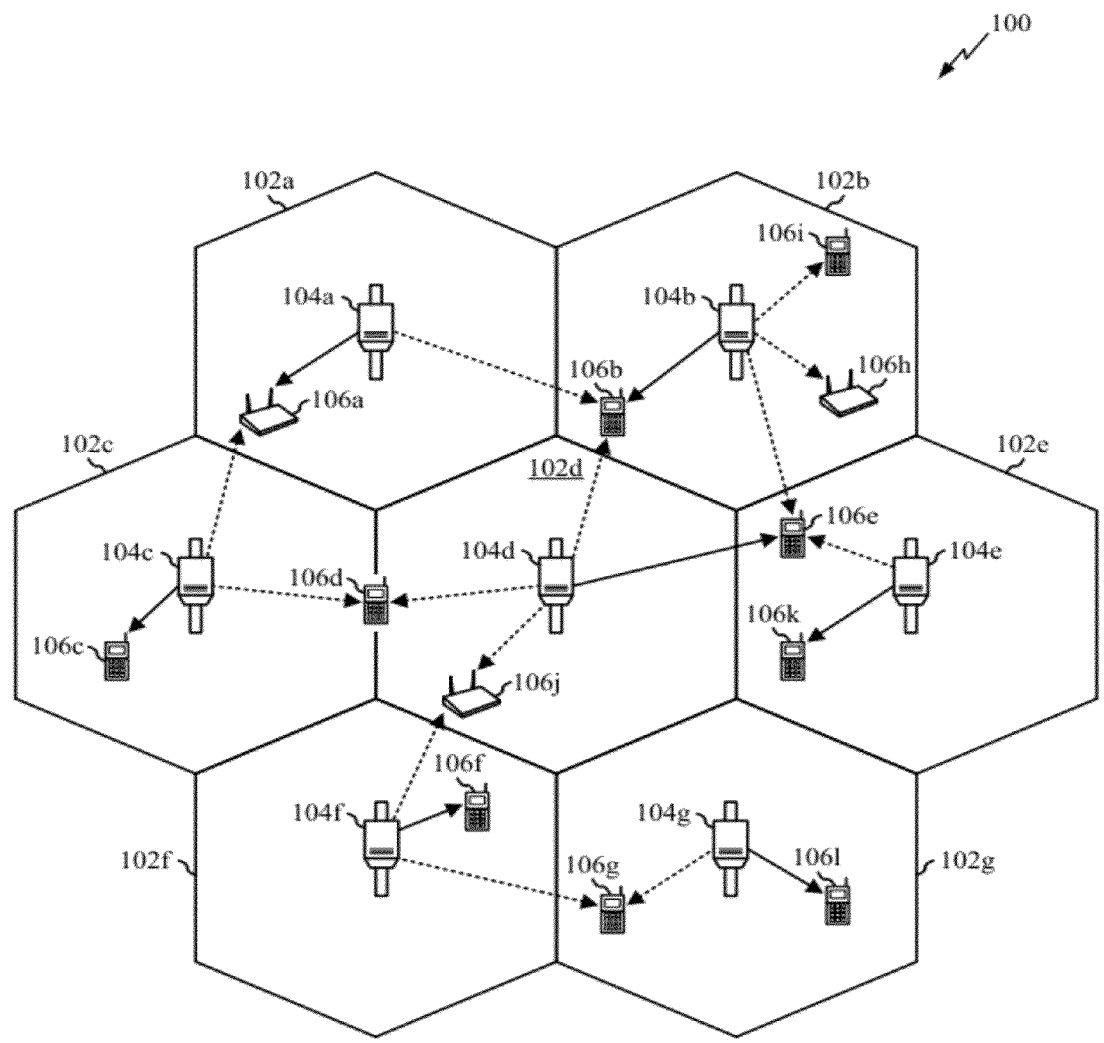
FIG. 1 shows an exemplary wireless communication network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Furthermore, in the following description, for reasons of conciseness and clarity, terminology associated with the Long Term Evolution (LTE) Evolved Universal Terrestrial Radio Access (E-UTRA) systems is used. The LTE E-UTRA technology is further described in the 3GPP TS 23.401: GPRS Enhancements for E-UTRAN Access (Release 8), which is hereby incorporated by reference in its entirety. It should be emphasized that the invention may also be applicable to other technologies, such as technologies and the associated standards related to Wideband Code Division Multiple Access (WCDMA), Time Division Multiple Access (TDMA), Orthogonal Frequency Division Multiple Access (OFDMA), Evolved High Rate Packet Data (eHRPD) and so forth. Terminologies associated with different technologies can vary. For example, depending on the technology considered, the User Equipment (UE) used in LTE can sometimes be called a mobile station, a user terminal, a subscriber unit, an access terminal, etc., to name just a few. Likewise, the Serving Gateway (SGW) used in LTE can sometimes be called a gateway, a HRPD serving gateway, and so forth. Likewise, the evolved Node B (eNB) used in LTE can sometimes be called an access node, an access point, a base station, a Node B, HRPD base station (BTS), and so forth. It should be noted here that different terminologies apply to different technologies when applicable.

Furthermore, in the following description, for reasons of conciseness and clarity, terminology associated with the evolved High Rate Packet Data (eHRPD) systems is also used. Aspects associated with networking between E-UTRAN and eHRPD are further described in the 3GPP2 X.P0057: E-UTRAN-eHRPD Connectivity and Interworking: Core Network Aspects, which is hereby incorporated by reference in its entirety. It should be emphasized that the invention may also be applicable to other technologies as previously described.

FIG. 1 shows an exemplary wireless communication network. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one implementation, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

Figure 2:
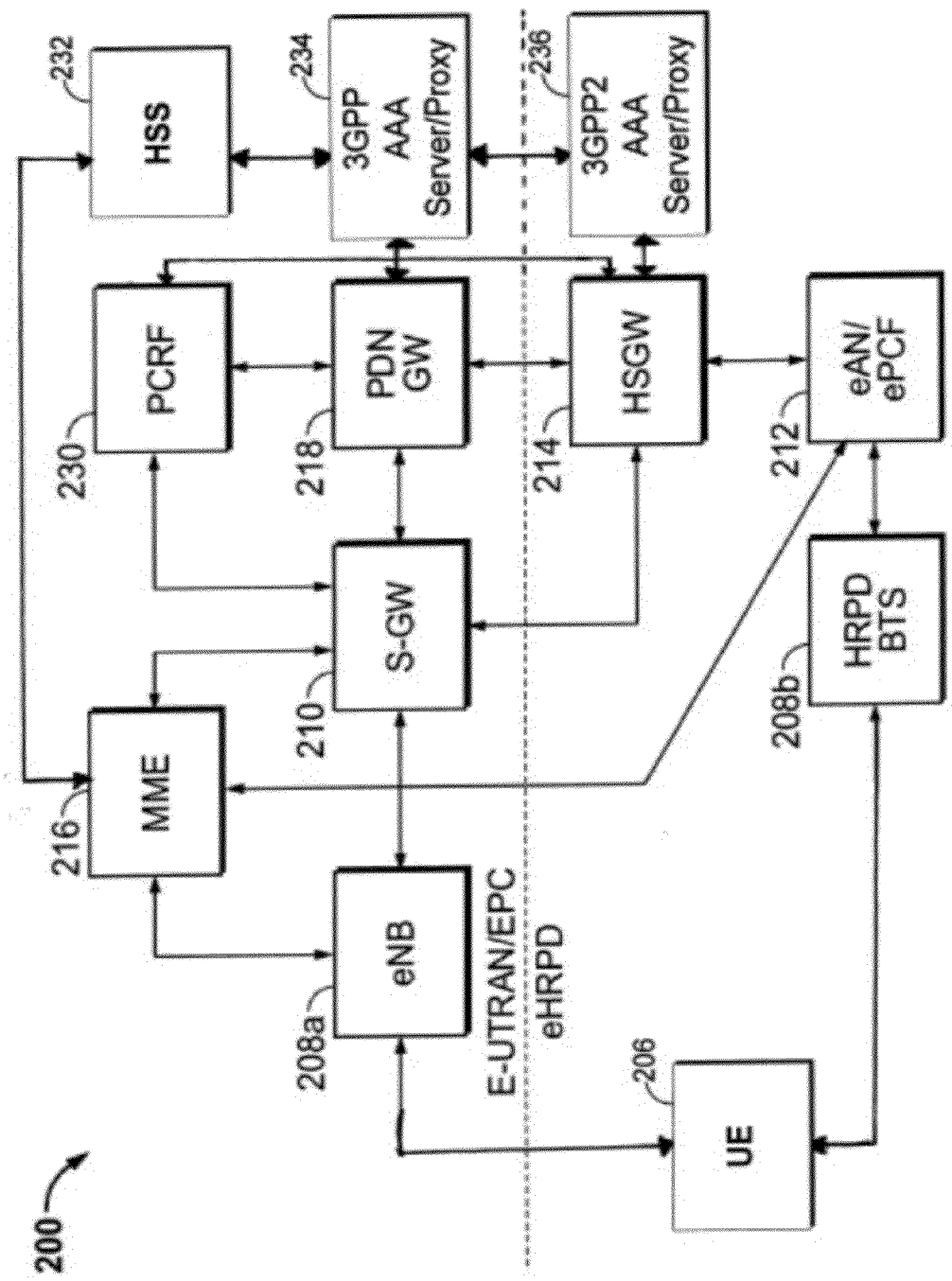
FIG. 2 shows an example of a functional block diagram of certain communication entities of the communications network of FIG. 1 in accordance with various aspects.

FIG. 2 shows an example of a functional block diagram of certain communication entities of the communications network of FIG. 1 in accordance with various aspects. The components shown in FIG. 2 illustrate a system in which a multimode device may communicate using multiple radio access technologies (RATs), for example either an eHRPD network or an LTE network, depending on the configuration of the network in the location in which the mobile device is currently operating. As FIG. 2 illustrates, the system 200 may include a radio access network RAN that provides wireless radio communications between a UE 206 and an evolved NodeB (eNB) 208a (e.g., a base station, access point, etc.) using LTE radio access technology. The system also depicts a RAN which provides wireless radio communications between a UE 206 and a HRPD base transceiver station (BTS) 210 (e.g., a base station, access point etc.) using eHRPD radio access technology. For simplicity of discussion, FIG. 2 depicts a UE 206 and one eNB 208a in a RAN and one HRPD BTS 208b in another RAN; however, it is to be appreciated that each RAN may include any number of UEs and/or eNBs/HRPD BTSs. In accordance with one aspect, the eNB 208a and HRPD BTS 208b may transmit information to a UE 206 over a forward link or downlink channel and a UE 206 can transmit information to the eNB 208a and HRPD BTS 209b over a reverse link or uplink channel. As shown, RANs can utilize any suitable type of radio access technology such as, but not limited to, LTE, LTE-A, HSPA, CDMA, high rate packet data (HRPD), evolved HRPD (eHRPD), CDMA2000, GSM, GPRS, enhanced data rate for GSM evolution (EDGE), UMTS, or the like.

The RANs, and specifically the eNB 208a and HRPD BTS 208b, can communicate with a core network that enables charging (e.g., usage charges for services, etc.), security (e.g., ciphering and integrity protection), subscriber management, mobility management, bearer management, QoS handling, policy control of data flows, and/or interconnections with external networks 220. The RANs and core network can communicate via an Si interface, for instance. The core network can include a mobility management entity (MME) 216 that can be an end-point for control signaling from the RAN 210. The MME 216 can provide functions such as mobility management (e.g., tracking), authentication, and security. The MME 216 can communicate with the RANs via the Si interface. The core network can also include a serving gateway (S-GW) 210 which is a user plane node that connects the core network to the LTE RAN. The core network may also include a HRPD serving gateway (HSGW) 214 which connects the core network to the eHRPD RAN. The eHRDP RAN also includes an evolved access node (eAN) and an evolved packet control function (ePCF) entity 212 which manages the relay of packets between the HRPD BTS 208b and the HSGW 214. In an aspect, the MME 216 can communicate with the S-GW 210 or the eAN/ePCF 212 via an S11 interface. Furthermore, the S-GW 210 and the HSGW 214 may communicate to facilitate interoperability between the eHRPD network and the EPC. In another aspect, the MME 216 and S-GW 210 can be configured as a single node to provide a single end-point for user and control signaling originating from a RAN and/or terminating at a RAN. The network may also include a policy and charging rules function (PCRF) 230. The PCRF 230 may communicate with the S-GW 210, the HSGW 214, the PDN GW 218 and the core network 220.

The core network can also include a packet data network (PDN) gateway (GW) 218 that facilitates communications between the core network (and the RANs) and external networks. The PDN GW 218 can provide packet filtering, QoS policing, charging, IP address allocation, and routing of traffic to external networks. In an example, the S-GW 210 and the PDN GW 218 can communicate via an S5 interface. While illustrated as separate nodes in FIG. 2, it is to be appreciated that the S-GW 210 and PDN GW 218, for example, can be configured to operate as a single network node to reduce user plane nodes in core network 220. In one aspect, the core network may also include a 3GPP authentication, authorization and accounting (AAA) server/proxy 234 and a 3GPP2 AAA server/proxy 236 which many communicate with each other and further communicate with the PDN-GW 218 and the HSGW 214 respectfully. The core network may also include a home subscriber services (HSS) entity 232 which may communicate with the MME 216 and the 3GPP AAA server/proxy 234.

The core network can communicate with external networks via the PDN GW 218. The external networks, not shown, can include networks such as, but not limited to, a public switched telephone network (PSTN), an IP multimedia subsystem (IMS), and/or an IP network. The IP network can be the Internet, a local area network, a wide area network, an intranet, or the like. It should be appreciated that configuration shown in FIG. 2 is an example of just one possible configuration and many other configurations and additional components may be used in accordance with various aspects and implementations described below.

Figure 3:
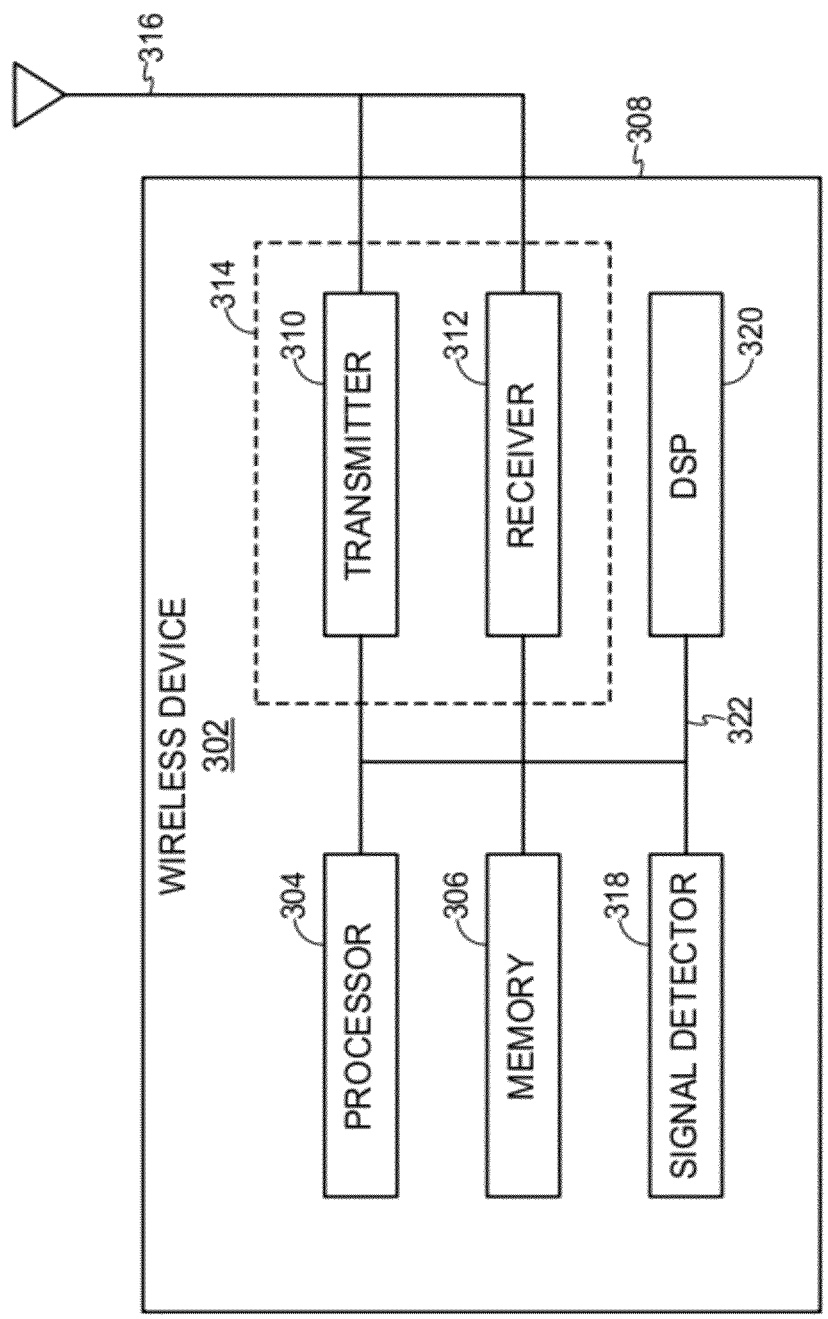
FIG. 3 shows an example of a functional block diagram of an exemplary user equipment (UE) shown in FIG. 2.

FIG. 3 shows an example of a functional block diagram of an exemplary user equipment (UE) shown in FIG. 2. The wireless device 302 may be multimode, capable of operating using different radio access technologies (RATs) such as using LTE or eHRPD. The device 302 is an example of a device that may be configured to implement the various methods described herein. The wireless device 302 may implement any of the devices illustrated in FIGS. 1-2.

The device 302 may include a processor 304 which controls the operation of the device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the device 302 (e.g., through an interface, SIM card, download, over the air). The processor 304 may perform logical and arithmetic operations further based on the configuration data. One type of configuration data that may be included is network preferences. For example, the device 302 may be configured to prefer accessing an LTE network as opposed to an eHRPD network. In this case, the LTE network may be referred to as the preferred network and the eHRPD network may be referred to as the non-preferred network. The preference may be based on factors such as user input, service provider input, service provider, bandwidth, subscription, radio access technology, signaling mode, and the like.

In some implementations, the network preferences may include several networks organized, at least in part, by preference. If a first preferred network is not available, the processor 304 may cause the device 302 to seek the second network. If the second network is unavailable, the processor may cause the device 302 to continue through the list of networks. In some implementations, the processor 304 may include instructions to re-try connecting with a previously unavailable, but preferable, network.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The device 302 may also include a housing 308 that may include a transmitter 310 and a receiver 312 to allow transmission and reception of data or instructions, for example wirelessly and/or over one of many known interfaces. The transmitter 310 and receiver 312 may be combined into a transceiver 314. In some aspects, a single or a plurality of transmit antennas may be attached to the housing 308 and electrically coupled to the transceiver 314. For example, when the device 302 is used to implement a UE or AT 106*a*, or an AP 104*a* or eNB 208*a* or HRPD BTS 208*b*, the device 302 may comprise one or more antennas. The device 302 may also include (not shown) multiple transmitters, multiple receivers, and/or multiple transceivers.

In some aspects, the device 302 also includes a signal detector 318 that may be used in an effort to detect and quantify the level of signals received by the transceiver 314. The signal detector 318 may detect such signals as total energy, energy per subcarrier per symbol, power spectral density and other signals.

The device 302 may also include a digital signal processor (DSP) 320 for use in processing signals.

The various components of the device 302 may be coupled together by a bus system 322, which may include a power bus, a control signal bus, and a status signal bus in addition to a data bus. The device 302 may further include other components or elements as will be understood by those having ordinary skill in the art.

Although described separately, it is to be appreciated that functional blocks described with respect to the device 302 need not be separate structural elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the UE 206a may also be implemented as a combination of computing devices, e.g., a combination of a DSP and a microprocessor, a plurality of microprocessors, one or more microprocessor in conjunction with a DSP communication, or any other such configuration.

As a UE moves throughout a network, the UE may be required to perform a handoff from a part of the network using one radio access technology (RAT) to another part of the network using another RAT. For example, as shown in FIG. 2, a multimode UE may be configured to transition from a network using LTE radio access technology to another part of the network using eHRPD radio access technology. A handoff may refer to a process of transferring an ongoing call or data session from one channel coupled to a network to another channel. The channel may be on the same network or coupled to a different network than the current channel. The term "handover" may also be used to refer to a handoff. When performing a handoff, the UE and the target network may exchange a variety of signaling and perform various operations to establish a new session and configure the traffic channel for sending and receiving data on the target network. Preferably, no interruption in service should occur during the handoff.

In one aspect, the handoff may be "optimized" to reduce the interruption that may occur due to the time needed for the signaling required to establish a connection to the target network. For example, an interface, such as an S101 interface, may be used to allow a UE 206 to establish and maintain an eHRPD radio session and HSGW 214 context. In other words, an "optimized" handoff may allow for pre-establishment and maintenance of eHRPD and PPP context while the UE 206 is active on the LTE RAN. During an active handoff, traffic channel assignment procedures may be executed through a tunnel defined by the interface. "Optimized" handoffs may reduce the interruption gap for transmitting data, for example, to less than 300 milliseconds, which may be short enough to allow a seamless voice over IP (VoIP) transfer.

In another aspect, the handoff may be "non-optimized." A "non-optimized" handoff may apply in two different circumstances. In one scenario, when a UE 206 transitions between one RAT to another, the UE may have no information (context) about the target network to use when performing the handoff. For example, a UE may first establish a connection to a LTE RAN and later transition to an eHRPD RAN for which it has not previously established a connection. In this scenario, tasks such as establishing an eHRPD radio session, performing eHRPD pilot acquisition and overhead update, and various other operations, as will be described below, may be performed during the handoff. In this scenario, a significant interruption gap may result as the various signals are exchanged and operations are completed.

In another scenario, a handoff may be to a target network, such as an eHRPD RAN, for which a partial context exists. For example, a UE may first establish a connection to an eHRPD RAN and later transition to an LTE RAN. When the UE establishes a new session with the LTE, the UE and the eHRPD network may save or retain certain information regarding the context established with the eHRPD RAN. Later, if the UE transitions to the original eHRPD RAN, the UE and eHRPD network may use the information (i.e., the partial context) to establish a new session and configure the traffic channel, etc.

In general, to begin exchanging data with the target RAN, such as an eHRPD RAN, both a new radio session and a new PPP context may be established for the handoff to be completed. Establishing the PPP context with an eHRPD RAN may further include, among other tasks, establishing a link control protocol (LCP) context, an authorization context (e.g., using extensible authentication protocol for authentication and key agreement (EAP-AKA)), a vendor specific network control protocol (VSNCP) context, and a QoS context. If the partial context described above already exists, the radio session, the LCP context and the authorization context may be configured through use of the partial context and may not have to be fully performed, if at all, during a handoff. While this may reduce the interruption that may occur during a handoff, the VSNCP context may still have to be established during the handoff procedure. The time needed to establish the VSNCP context may still result in an undesirable interruption gap causing significant disruptions to traffic flows.

In one example, the eHRPD session/PPP partial context may be created after camping on LTE. It may be desirable to suspend the LTE data before transitioning to eHRPD to create the eHRPD session and partial context. Accordingly, the timing of the context creation and subsequent maintenance of the partial context may be configured to improve the handoff. In some implementations, a UE may not communicate with an eNodeB to let the eNodeB know that it is temporarily leaving a LTE system. As a result, this may cause missing paging without notifying the LTE system. Alternatively, a UE implementation specific solution adds complexity to the device. In another aspect, it may be desirable to guarantee that an eHRPD session/PPP partial context is updated in an eHRPD system when the UE performs handoff to the LTE system. This may not be possible in all implementations since the UE may not be able to tune to eHRPD if the UE is on a LTE traffic channel and/or the UE is not aware of a master session key (MSK) lifetime and the partial context timer. Therefore, partial context can be expired when handoff occurs from LTE to eHRPD.

In some implementations, a handoff performance gain may be achieved through the use of "partial context maintenance." For example, an analysis of the handoff interruption time indicates that an optimized handoff takes approximately 100 ms (due to a break time and tuning traffic channel based on traffic channel assignment (TCA) obtained over a tunnel). Also, a non-optimized handoff takes approximately 1.6 seconds (due to overhead message processing, HRPD access and TCA, VSNCP procedure, QoS setup, etc.). In certain implementations that early register with an eHRPD and maintain the session and a partial context in LTE in an idle state, handoff may take approximately 1.6 seconds (due to overhead message processing, HRPD access+TCA, VSNCP procedure, QoS setup, etc.). This offers no improvement over a standard non-optimized handoff. In some implementations, this may actually degrade service. For example, streaming media may be supported with such breaks. However, streaming media also can buffer sufficient data. In another example, real time services such as voice over Internet protocol (VoIP) and video telephony (VT) may include S101 based optimized handoff. The break may be about 100 ms for real time service.

In another aspect, eHRPD session and PPP session maintenance may not be useful if the UE is in deep coverage of LTE. For example, the UE may move subnet boundaries for eHRPD, while the UE is using a LTE network. It may not be desirable that the UE keeps detecting the subnet boundary and re-registering with the eHRPD network. If the UE is well under LTE coverage, even though subnet of eHRPD changes, the changes may be irrelevant since, most likely, the UE may not perform handoff to eHRPD. The handoff may be needed at the edge of LTE coverage. In some deployments, there are only a limited number of eHRPD subnets at the edge of the LTE coverage. In the event that there is a coverage hole in LTE and the UE needs to be transitioned to eHRPD, the session transfer may occur. However, this is not considered to be a frequent event. Some implementations do not clearly specify how the LTE network can indicate the edge of LTE coverage.

In another aspect, the certain optimizations may introduce complexity to the UE. For example, the requirement to choose eHRPD after LTE acquisition requires modifications to existing procedures (e.g., Multimode System Selection (MMSS) procedures). This may include specific workarounds in the device to enable this proposal. LTE data needs to be suspended before transitioning to eHRPD to create the eHRPD session and partial context. Also, maintaining the context over eHRPD can impact the battery life of the device. For example, additional or redundant HRPD session maintenance when the UE is in deep LTE coverage and the eNodeB sends eHRPD neighbor information may consume battery resources. The partial PPP context needs to be maintained. This may be unnecessary until the UE needs to transition from LTE to eHRPD, which may happen only on the border of the LTE networks.

In one aspect, a based on UE implementation, the UE may perform an initial attach on an eHRPD network during a period of data inactivity, such as at the time of power up. The UE may perform an "Initial Attach" on an eHRPD network even though an LTE network is available. In one example, this step can be controlled by setting a "Mode Setting" value to "C2K mode" instead of "Global setting." The UE may be configured to create the full context over eHRPD and then transition to LTE. The HSGW may be configured to keep a partial context when receiving PMIP revocation from LTE. In one example, the HGSW may include a Partial Context timer (e.g., UE context maintenance timer). The partial context time may be initialized with a large value, for example, set to the remaining value of MSK lifetime value at the time of partial context transition.

Accordingly, a partial context is created and maintained on a first network and is available to receive a handoff should a second, preferred network become unavailable. This approach addresses the timing and maintenance of the context for the first network, which, in the above examples, is an eHRPD network. Optimizing how the partial context is recovered to the full context may further improve the handoff as will be discussed in further detail below.

Figure 4:
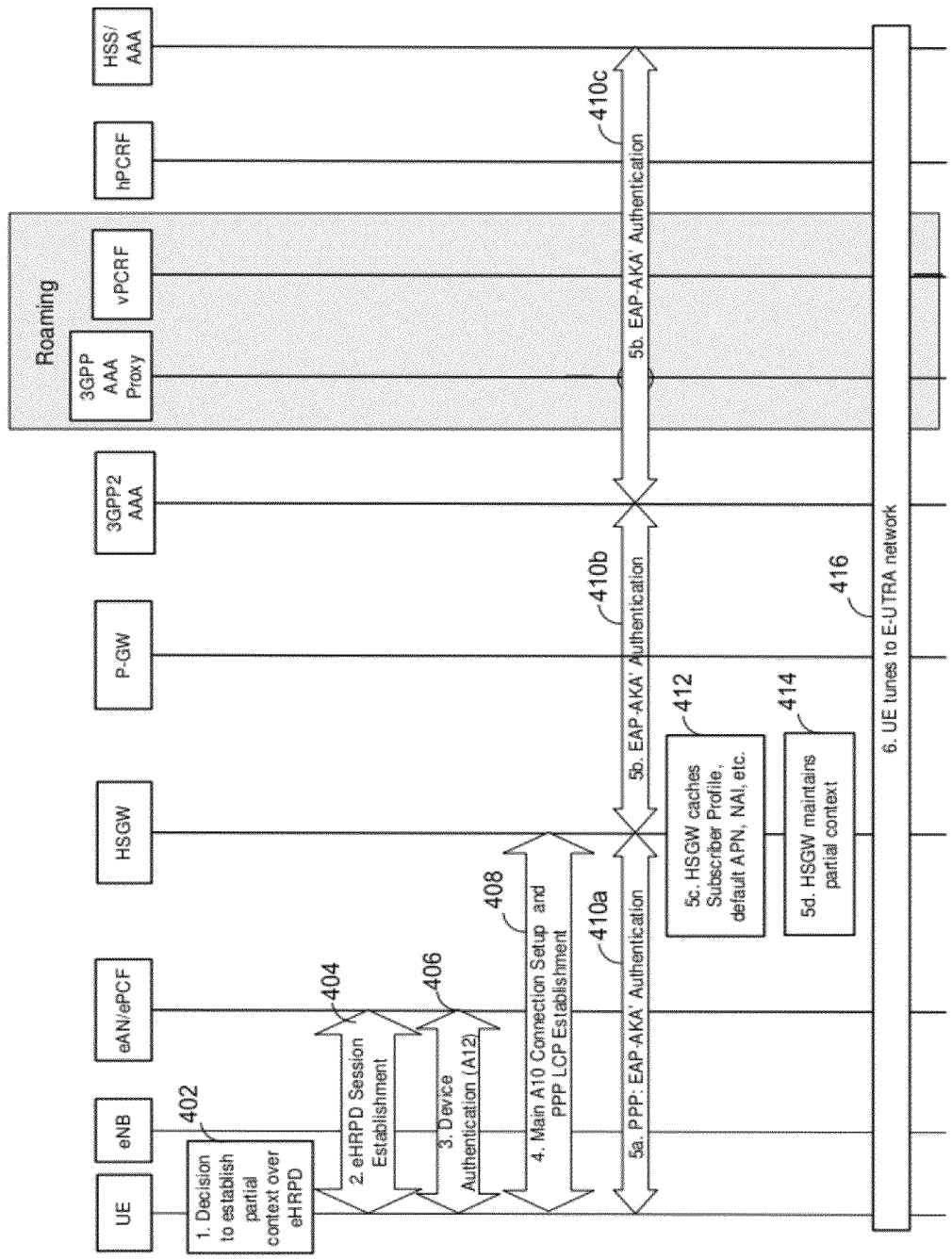
FIG. 4 shows an exemplary signal flow diagram illustrating signal flow exchanged among the various entities of FIG. 2 before a handoff occurs.

FIG. 4 shows an exemplary signal flow diagram illustrating signal flow exchanged among the various entities of FIG. 2 before a handoff occurs. Specifically, FIG. 4 shows an example of a flow diagram illustrating the signals that may be exchanged before a handoff occurs to establish a partial context with an eHRPD RAN. In one aspect, this may be described as a pre-registration phase. In this phase, the UE may perform a partial-attach to the eHRPD RAN which may include the establishment of the LCP, A10 and authentication contexts. FIG. 4, and the figures described below, illustrates examples of the signals that may flow between the various entities shown in FIG. 2 when the UE 206 determines to establish a partial context over eHRPD 402. To establish the partial context, the UE performs eHRPD session establishment 404 and device authentication 406 (e.g., using A12 authentication) with the eAN/ePCF 212. This may be accompanied by an A10 connection setup and a point to point (PPP) LCP establishment 408 with the HSGW 214. An EAP-AKA authentication context is also established 410a, 410b and 410c. After authentication, the HSGW 214 may cache the subscriber profile, the default access point name (APN), the network access identifier (NAI), and other necessary information 412 for the partial context. The HSGW may then maintain the partial context 414. After the partial context is established, the UE may tune to the E-UTRA network 416.

Figure 5:
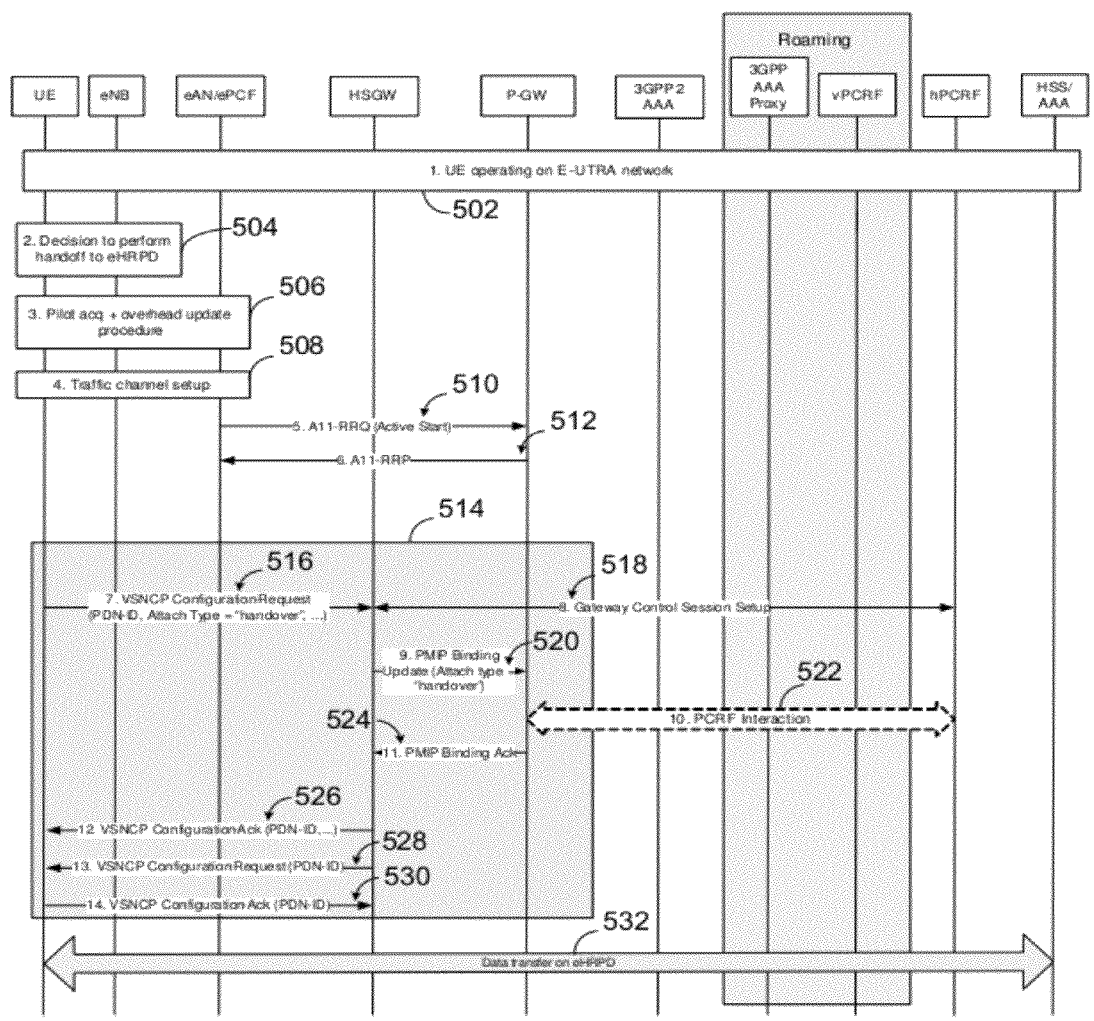
FIG. 5 shows an exemplary signal flow diagram illustrating signal flow exchanged among the various entities of FIG. 2 when a handoff occurs.

After a partial context has been established as shown in FIG. 4, an actual handoff using the partial context may occur. FIG. 5 shows an example of a flow diagram illustrating the signals that may be exchanged during the handoff-phase. In the handoff-phase, the UE may establish the VSNCP context and perform a handoff attach, but may not have to establish the LCP and authorization contexts, as the partial context can be used. As shown in FIG. 5, a UE may be operating on an E-UTRA network 502 when the UE 206 determines that a handoff to eHRPD 504 is necessary. Pilot acquisition and overhead update 506 is performed and the traffic channel is established 508. The UE 206 may recognize that an A10 session associated with the UE 206 is available and may send an "Active Start" message 510 and receive an A11-registration reply message 512. VSNCP operations 514 are then performed for each packet data network (PDN) connection needed on the eHRPD. For a PDN connection, a VSCNP configure-request message is sent which may include a PDN-ID, a PDN-type, an APN, a PDN address, protocol configuration options and an attach type 516 as will be further described below. The HSGW 214 may then perform a gateway control session setup 518 with the PCRF 230. A proxy mobile IP (PMIP) binding update message may then be sent 520 and the P-GW 218 may perform a PCRF interaction to retrieve QoS policy parameters 522. A PMIP binding-ack message may then be sent 524 to the HSGW 214 in response. At this point, the HSGW 214 may send a VSNCP configure-ack message to the UE 526 and a VSNCP configuration-request message 528. The VSNCP configuration-request message may include the PDN-ID and an IPv4 address, for example. In response, the UE 206 may send a VSNCP configuration-ack message 530 to the HSGW 214 and data transfer on the eHRPD network may then begin 532.

As shown in FIG. 5, the various operations performed during the handoff can cause a significant interruption gap before traffic data may begin to be exchanged. An interruption gap such as the one just described may be undesirable or even unacceptable for operators interested in deploying real-time services using "non-optimized" handoffs. If a mobile station (MS) first powers up in an LTE system, no partial context may exist in the eHRPD system when the MS handoff from LTE to eHRPD occurs. In another example, a partial context may be expired when the MS performs non optimized handoff from LTE to eHRPD. Therefore, in one aspect, a proposed solution is to make an eHRPD session and partial context established and keep it updated before the UE moves from LTE to eHRPD. In this way, the system may reduce the interruption gap, without adding extra hardware or increasing costs, and may provide various advantages such as but not limited to allowing for real-time services to continue as seamlessly as possible during handoffs from a LTE network to an eHRPD network.

As described above, as the partial context may not include the VSNCP context, the VSNCP context may be established during a handoff, which results in an increased interruption gap before traffic can be sent. According to one implementation, to reduce the time required to establish the VSNCP context, one or more VSNCP configure-request messages may be sent from the UE 206 to the eHRPD network over a signaling channel, such as the access channel, using data over signaling (DoS), for example. Furthermore, as will be further described below, a new configuration option for the VSNCP message may be provided to reduce the number of octets required to be sent when establishing the VSNCP context.

Figure 6:
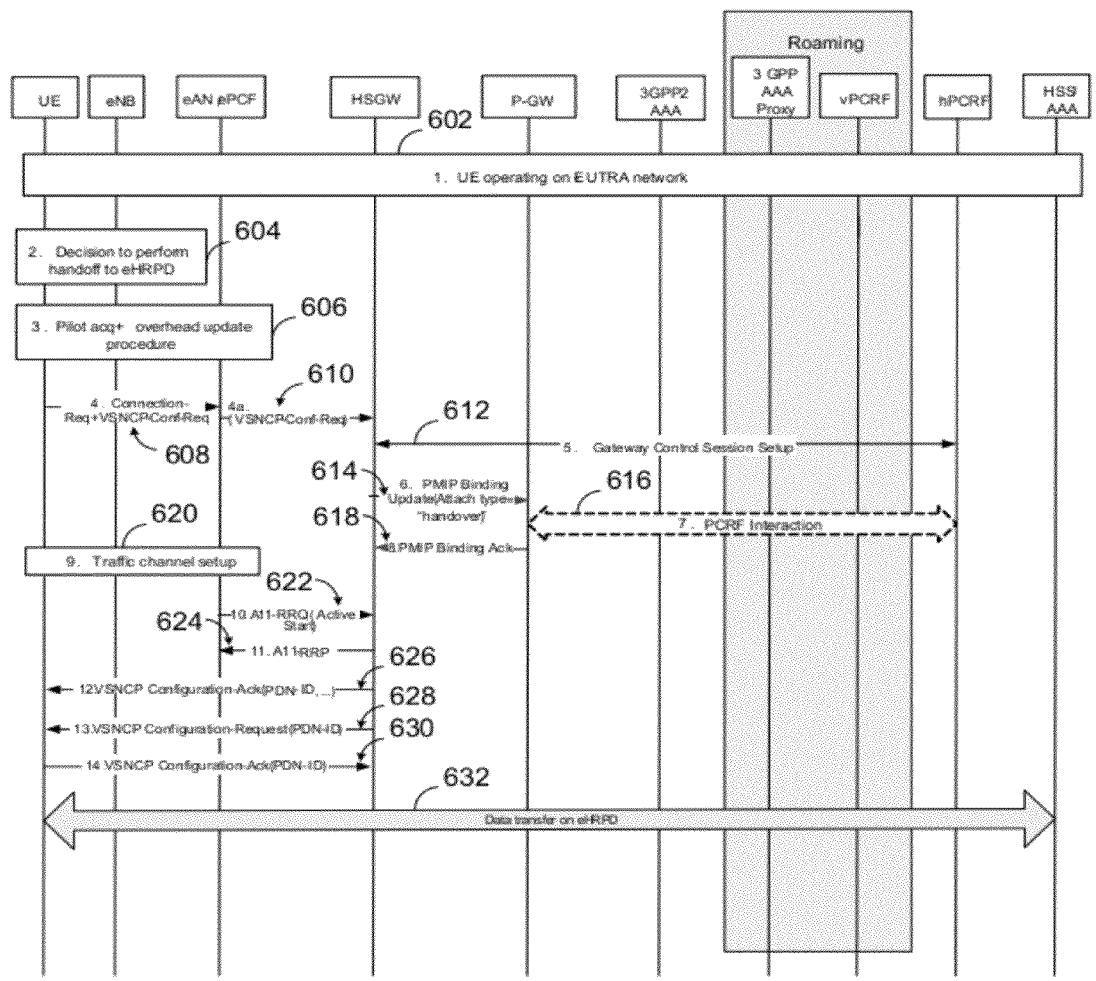
FIG. 6 shows another exemplary signal flow diagram illustrating signal flow exchanged among the various entities of FIG. 2 when a handoff occurs.

FIG. 6 shows another exemplary signal flow diagram illustrating signal flow exchanged among the various entities of FIG. 2 when a handoff occurs. Specifically, FIG. 6 shows an example of a flow diagram illustrating the signals that may be exchanged during the handoff-phase for reducing the interruption gap caused by VSNCP context establishment operations. As shown in FIG. 6, a UE may be operating on an E-UTRA network 602 when the UE 206 determines that a handoff to eHRPD 604 is necessary. A partial context with the target eHRPD network may have been previously established. Pilot acquisition and overhead update 606 is performed. In contrast to FIG. 5, before the traffic channel is established, a connection request along with a VSNCP configuration-request message may be sent 608 to the eAN/ePCF 212 on a signaling channel using DoS. For example, the access channel may be used. In this case, the number of octets used by the VSNCP data packet may need to be reduced to a minimum. The eAN/ePCF 212 may then send the VSNCP configuration-request message 610 to the HSGW 214. At this point, the HSGW 214 is able to perform a gateway control session setup 612 with the PCRF 230. A proxy mobile IP (PMIP) binding update message may then be sent 614 and the P-GW 218 may perform a PCRF interaction to retrieve QoS policy parameters 616, for example. A PMIP binding-ack message may then be sent 618 to the HSGW 214 in response. Sending the VSNCP configuration request message using a signaling channel may allow for VSNCP context establishment procedures to begin before or while the traffic channel is established. In this way, traffic channel establishment and VSNCP setup procedures (along with PMIP binding) may be performed in parallel. As traffic channel establishment may take more time than VSNCP setup and PMIP binding, doing the operations in parallel may essentially hide the time required for VSNCP setup and PMIP binding. Thus, the time needed for VSNCP setup and PMIP binding may not contribute additionally to the interruption gap. Sending the VSNCP configuration-request message over a signaling channel may therefore introduce significant time savings during the handoff process as the VSNCP context establishment may not have to depend on the completion of the traffic channel setup.

Continuing with FIG. 6, traffic channel setup procedures are performed 620 after the UE 206 sends the VSNCP configuration-request 608. The traffic channel setup may be performed simultaneously with the messages exchanged at 610, 612, 614, 616, and 618 such that minimal or no interruption gap is introduced due the VSNCP context establishment operations. After the traffic channel is setup 620, the UE 206 may recognize that an A10 session associated with the UE 206 is available and may send an "Active Start" message 622 and receive an A11-registration reply message 624. At this point, the HSGW 214 may send a VSNCP configure-ack message 626 to the UE 206. The HSGW 214 may also send a VSNCP configuration-request message 628 to the UE 206 to which the UE 206 may send a VSNCP configuration-ack message 630 in response. Data transfer may also begin on the eHRPD 632.

Figure 7A:
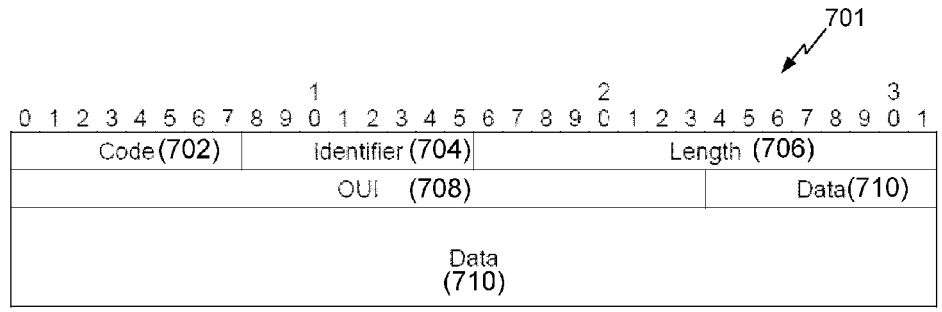
FIG. 7A shows an example of a VNSCP message format.

FIG. 7A shows an example of a VSNCP message format. As described above, reducing the size of the VSNCP signaling data packets (e.g., reducing the number of octets required) may facilitate sending the VSNCP configuration-request over a signaling channel and may provide other processing advantages for reducing the interruption gap during a handoff. Various aspects associated a VSNCP packet are further described in RFC 3772 entitled Point-to-Point Protocol (PPP) Vendor Protocol, which is hereby incorporated by reference in its entirety. Furthermore, various aspects associated with the VSNCP packet are also described in RFC 1661 entitled The Point-to-Point Protocol (PPP), which is also hereby incorporated by reference in its entirety. The VSNCP packet may include a one octet code field 702 which may be used to identify the type of control packet. The code field 702 may be configured to use seven different codes which may include VSNCP configure-request, configure-ack, configure-nak, configure-reject, terminate-request, terminate-ack, and code-reject codes. In one aspect, the configure-nak code may not be used and any message sent with this code can result in a code-reject message being sent in response. The VSNCP packet may further include a one octet identifier field 704 which may be used to for matching requests and replies. The VSNCP packet may also include a two octet length field 706 used to indicate the total length of the packet including the code, identifier, length and data fields. The VSNCP packet may also include a three octet vendor organizationally unique identifier (OUI) 708 field to identify a specific vendor. As depicted in FIG. 7A, the rest of the message is allocated for sending data 710 as will be further described below.

When sending a VSNCP configure-request message for a handoff attach, the message includes a number of configuration options sent in the data field 710. Table 1, included below, provides a list of various configuration options that may be sent in one implementation of a 3GPP2 VSNCP.

TABLE 1

| Configuration Option | Type (decimal) | Configuration Option Length (octets) | Value |
| --- | --- | --- | --- |
| PDN Identifier | 01 | 3 | PDN Identifier is a 1 octet identifier selected by the UE for a PDN. Valid values are from 0 to 14. The value 15 is reserved for future use. This option shall be present as the first configuration option in all 3GPP2 VSNCP packets. |
| Access point name | 02 | 2-102 | Value field of the Access Point Name IE. |
| PDN Type | 03 | 3 | Valid values are<br>1—IPv4<br>2—IPv6<br>3—IPv4/IPv6<br>Value portion of the PDN Type IE. |
| PDN address | 04 | 3-15 | Value portion of the "PDN Address" IE. The VSNCP Configure-Request message sent by the UE for initial attach to an APN, the PDN type field of the PDN Address option shall be set to '000' and the Length field of the PDN |

TABLE 1-continued

| Configuration Option | Type (decimal) | Configuration Option Length (octets) | Value |
|---|---|---|---|
| | | | Address option set to 3, with no IPv4 or IPv6 address information included. |
| Protocol configuration options | 05 | 3-253 | Value portion of the Protocol Configuration option value. |
| Attach Type | 07 | 3 | Valid values are<br>1—"Initial Attach" to a PDN,<br>3—"Handover" attach to a PDN. |
| IPv4 Default Router Address | 08 | 6 | Encoded a 4-octet IPv4 address. Includes IPv4 Default Router address assigned by PDN gateway for the PDN. |
| IPv6 HSGW Link Local Address IID | 11 | 10 | Encoded as an 8-octet IPv6 interface identifier of the HSGW link local address. |
| User Context Identifier | 12 | 3 | User Context Identifier is a 4-bit identifier selected by the UE for each of the PDN connections to the same APN. Valid values are from 0 to 14. The value 15 is reserved for future use. |
| Emergency Indicator | 13 | 3 | Valid values are<br>1—"emergency services request"<br>0—"non-emergency services request"<br>The absence of this configuration option implies "non-emergency services request" |
| VSNP Extend Code Support | 15 | 3 | Indication whether the sender supports sending the VSNP Extend Code.<br>Valid values are<br>0—Sender does not support VSNP Extend Code,<br>1—Sender supports VSNP Extend Code.<br>The absence of this configuration option implies that the VSNP Extend Code capability is not supported. |
| Compression Parameters | 16 | >=4 | This option indicates the protocol types supported by the sender. Allowed IP-Compression-protocol types are:<br>0x0003—ROHC over PPP. Coding of the specific parameters shall follow Robust Header Compression (ROHC) Option, except for Type, Length and IP-Compression-Protocol fields.<br>Other values are reserved.<br>This configuration option may only be included in a message if the VSNP Extend Code Support option is also included and set to the value 1.<br>Multiple instances of this option may occur in the same message, but may not contain the same protocol type. |
| Default APN Indication | 17 | 3 | Valid values are:<br>0—"The requested APN is not the default APN"<br>1—"The requested APN is the default APN" |

Table 1 represents an example and other variations are contemplated as within the scope of the disclosure. In some implementations, the configuration option names may vary, the type may be represented by non-decimal values (e.g., integers) and may be non-consecutive, the length may vary, and/or the valid values may include more values or fewer values than shown. For example, in some implementations, it may be desirable to have an attach type of 5 octets and the valid values ranging from 1 to 6.

As seen in Table 1, the configuration options may occupy a large number of octets in the VSNCP configure-request message which may contribute to increasing the interruption gap during the handoff and make it difficult to transmit the VNSCP configure-request message on a signaling channel. Rather than sending the multiple configuration options described above, a single configuration option may be provided which may leverage common information between the configurations of the source and target networks. For example, many of the configuration options may be obtained by a target eHRPD network communicating with a source LTE network, as many of the capabilities of the two networks may be in common.

Figure 7B:
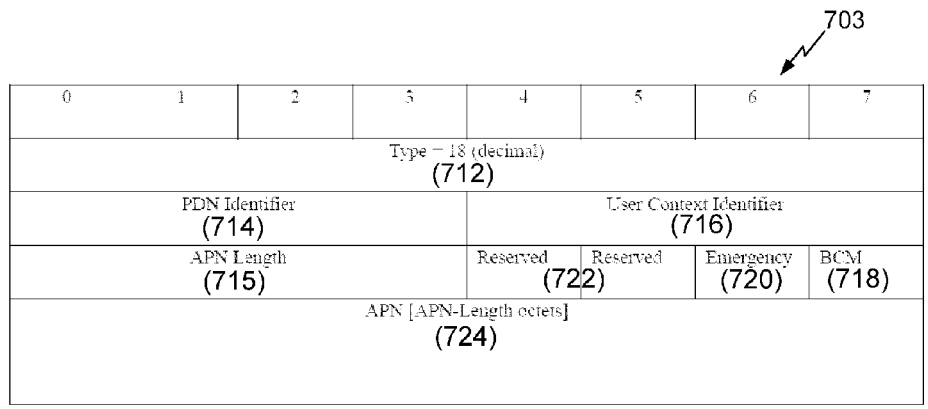
FIG. 7B shows an example of another VNSCP message format.

FIG. 7B shows an example of a single configuration option that might be used according to various implementations in place of the configuration options described above in Table 1. The new configuration option 703 may be described as a fast handoff attach configuration option. The new configuration option data may encapsulate necessary data from the configuration options described in Table 1 above to provide the HSGW 214 in eHRPD network with enough information to enable the HSGW 214 to obtain or derive the full set of configuration options needed to establish a connection with the PDN gateway. The configuration option 703 may be identified by a one octet type field 712 which indicates the configuration option type being used. The configuration option type may be set to the decimal value 18 so as to avoid overlapping with the currently defined configuration option types.

The configuration option 703 may include a four bit PDN identifier field 714. As valid values for this field may be defined to be between 0-14, only four bits may be necessary. As several configuration options are encapsulated into the fast attach configuration option, the type and length fields required by the configuration options in Table 1 may be omitted. For example, the PDN identifier field may normally require 3 octets, 2 of which may be occupied by the type of configuration option and the length fields. In contrast, the configuration option 703 allows for using the just four bit PDN-ID value along with other configuration options. The configuration option 703 may further include a four bit user context identifier field 716 to allow identification of multiple PDN connections. The configuration option 703 also includes a four bit APN length field 715 which may be used to specify the number of octets required by the APN field 724. The configuration option 703 may further include a one bit bearer control module field 718 which may be used to determine what type of quality of service (QoS) capability the network may support such as either network-initiated QoS or UE-initiated QoS. Furthermore, a one bit emergency field 720 may be provided for determining whether there is an emergency services request. Two reserved fields 722 may also be included.

In addition, the APN field 724 is also included in the configuration option 703 message which is used to identify the packet data network (PDN) for which the UE wishes to connect. As described in Table 1, the APN may be defined for requiring a total of 100 octets. According to one implementation provided herein, the length of the APN field 724 may be limited to 16 octets (for which is the maximum value the four bit APN length field 715 may specify). This helps to ensure that the maximum number of octets required by the configuration option 703 remains small enough for efficient transmission and processing of the message. Furthermore, by using the APN-length field 734, the number of octets in the APN field 724 may vary and may allow for a reduced number of octets required for the configuration option 703 when the APN uses fewer than 16 octets.

By using the configuration option 703 described in FIG. 7B, the remaining configuration options may not be sent. When the HSGW 214 receives the VNSCP message with the configuration option 703, the HSGW can use the common information retained using the partial context or retrieved from the LTE network to convert the reduced message into a format needed to communicate with the PDN-GW 218. By using common information between the LTE network and the eHRPD networks and encapsulating/reducing the configuration option data into the configuration option 703, the total number of bytes required for the VSNCP configuration-request message is significantly reduced. As shown in FIG. 7B, the total size of the VSNCP configuration-request message 701 can be a maximum of 26 bytes including seven bytes for the VSCNP message format header field shown in FIG. 7A along with the 3 bytes of the configuration options without the APN field 724, along with a maximum of 16 bytes for the APN field 724. By using the reduced-size configuration-request message described in FIGS. 7A and 7B along with sending the message on the signaling channel before the traffic channel is configured as shown in FIG. 6, the interruption gap may be significantly reduced as the time needed for the VSNCP context to be established may be accomplished without adding extra time beyond what is required for traffic channel establishment.

Figure 7C:
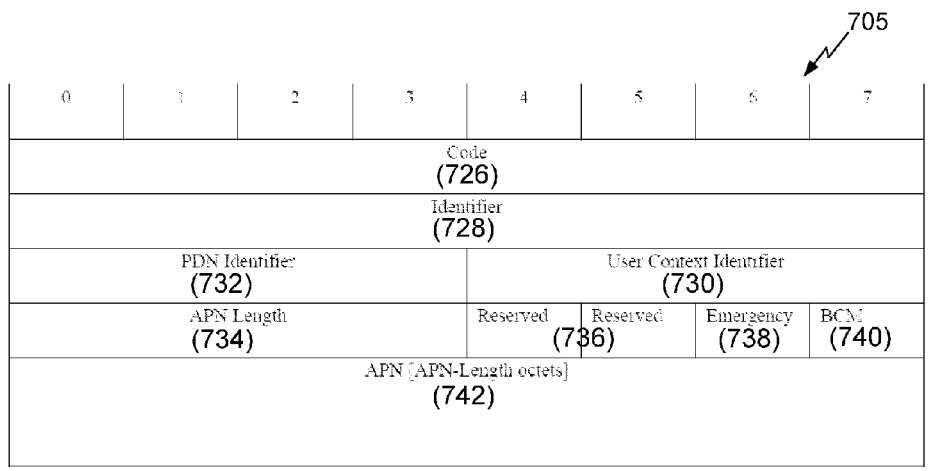
FIG. 7C shows an example of another VNSCP message format.

FIG. 7C shown an example of a VSNCP packet data format according to another implementation. As described above, seven codes may be defined for the code field 726 used to identify the type of control packet. According to one implementation, an eighth code may be added to define an additional VSNCP control message 705 apart from the configuration-request message. This configuration message 705 may be described as a fast-handoff-request message. The message format may then defined independently from the format required by the configuration-request message and therefore may not have to specify the configuration option type field 712 shown in FIG. 7B. As a result, some of the fields shown in FIG. 7B may be included in the fast-handoff-request message with the omission of the one octet type field 712. Furthermore, the three octet OUI field 708 may also be omitted from the VSNCP data message format 705. Consequently, the total number of bytes for the VSNCP data message format 705 could be reduced to four bytes for the VSNCP packet header and configuration options along with a maximum of 16 bytes for the APN field 742 for a total maximum of 20 bytes.

In the message format described in FIG. 7B, the APN field 724 occupies a large portion of the total bytes required by the message format 703, as at a maximum, the APN field 724 could contain up to 16 bytes. According to another implementation, to eliminate the need for the APN field 724, the pre-registration phase described above with reference to FIG. 4 may be modified so as to pre-configure the APNs. More specifically, a mapping between an APNs and a PDN-IDs may be sent from the UE 206 to the HSGW 214. The mapping may be deleted after the handoff occurs. The handoff as described above with reference to FIG. 6 may then be performed, but without including the APN field 724 and the APN-length field 715 as will be described in further detail below.

Figure 8:
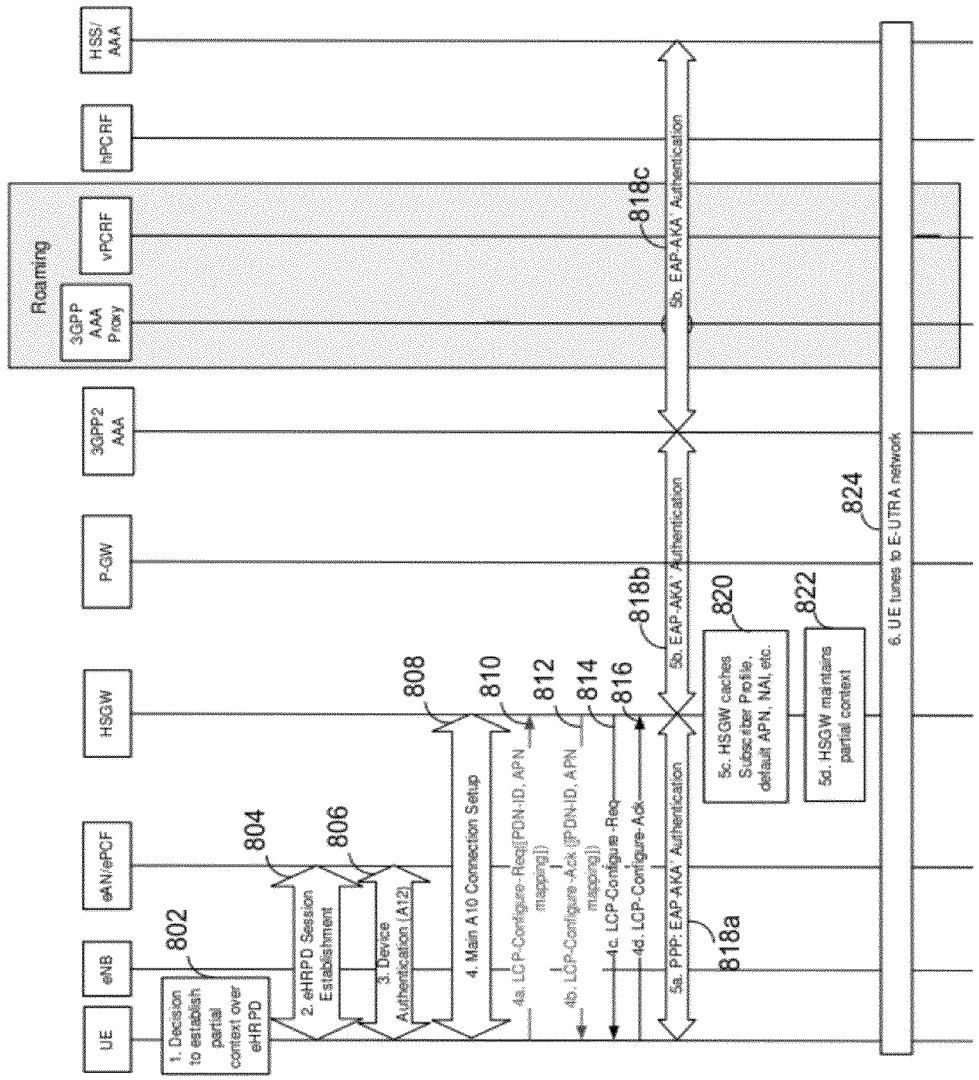
FIG. 8 shows another exemplary signal flow diagram illustrating signal flow exchanged among the various entities of FIG. 2 before a handoff occurs.

FIG. 8 shows another exemplary signal flow diagram illustrating signal flow exchanged among the various entities of FIG. 2 before a handoff occurs. Particularly, FIG. 8 shows an example of a flow diagram illustrating the signals that may be exchanged before a handoff occurs to establish a partial context with an eHRPD RAN according to the implementation as just described. After the UE 206 determines to establish a partial context over eHRPD 802, the UE performs eHRPD session establishment 804 and device authentication 806 (e.g. using A12 authentication) with the eAN/ePCF 212. This may be followed by an A10 connection setup 808 with the HSGW 214. During the PPP LCP context establishment, the UE may send an LCP configure-request message 810 containing a mapping of PDN-IDs to APNs to the HSGW 214. If the HSGW 214 accepts the mapping, the value is sent in the LCP configure-ack message 812. The HSGW 214 then sends an LCP configure-request message 814 to the UE 206 and the UE 206 responds with a LCP configure-ack message 816. At this point, an EAP-AKA authentication context is then established 818*a*, 818*b* and 818*c*. After authentication, the HSGW 212 may cache the subscriber profile, the default access point name (APN), the network access identifier (NAI), and other necessary information 820. The HSGW can then maintain the partial context 822. After the partial context is established, the UE may tune to the E-UTRA network 824. It should be appreciated that other LCP messages not shown in FIG. 8 may also be used to send the mapping to the HSGW 214. For example, the LCP-echo-request and reply may be used with vendor specific options, or vendor specific packets might be used.

As the HSGW may be configured to receive a mapping of PDN-IDs to APNs during the pre-registration phase shown in FIG. 8, a PDN identifier received during handoff may be sufficient to identify the associated APN. As a result, the message formats shown in FIGS. 7B and 7C may be modified to eliminate the APN fields and the APN-length fields.

Figure 9A:
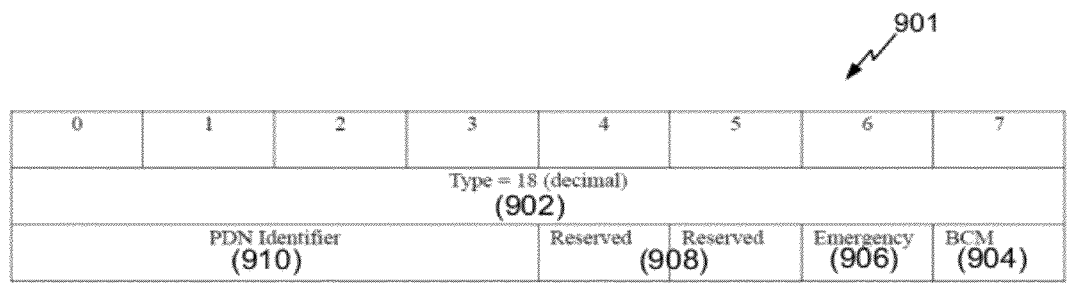
FIG. 9 shows an example illustrating a configuration request message format.
Figure 9B:
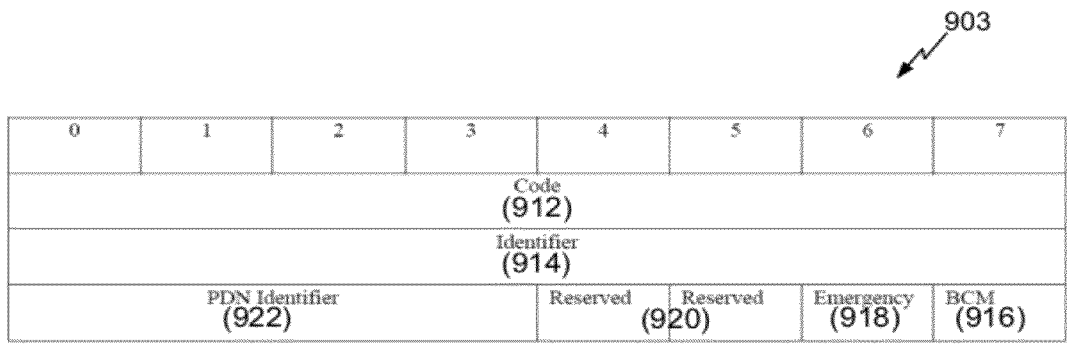

FIG. 9 shows an example illustrating a configuration request message format. FIGS. 9A and 9B show examples of the modified VSNCP packet data formats for use with the pre-registration phase, such as that shown in FIG. 8. FIG. 9A depicts a single configuration option 901 to be used in place of the configuration options described in Table 1 and as similarly shown in FIG. 7B. In FIG. 9A, the APN length field and APN field are omitted. As a result, in the implementation shown, the total number of bytes required can be nine bytes which includes the seven bytes required for the VSNCP message format headers and two bytes for the type field 902 specifying the new configuration option 901 and the other fields as described with reference to FIG. 7B. FIG. 9B corresponds to FIG. 7C which defines an eighth code to identify an additionally provided VSNCP fast-handoff-request message which allows the elimination of the type field 902 and the OUI field 708. In FIG. 9B, the APN field and the APN-length field may also be omitted in conjunction with the pre-registration phase shown in FIG. 8. As a result, the VSNCP message format required can be a total of three bytes as shown in FIG. 9B.

Figure 10:
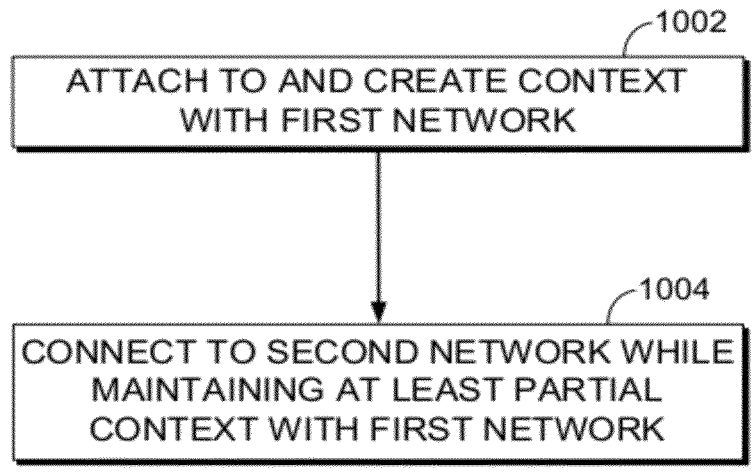
FIG. 10 shows a process flow diagram of a method handoff in a wireless communication system.

FIG. 10 shows a process flow diagram of a method handoff in a wireless communication system. At block 1002, a device implementing the method attaches to a first network and creates a context therewith. The device may be configured to attach during a period of data inactivity. In some implementations, the first network may be a non-preferred network as compared to the second network. At block 1004, connection to the second network is established based on the context created with the first network while maintaining at least a partial context with the first network.

Figure 11:
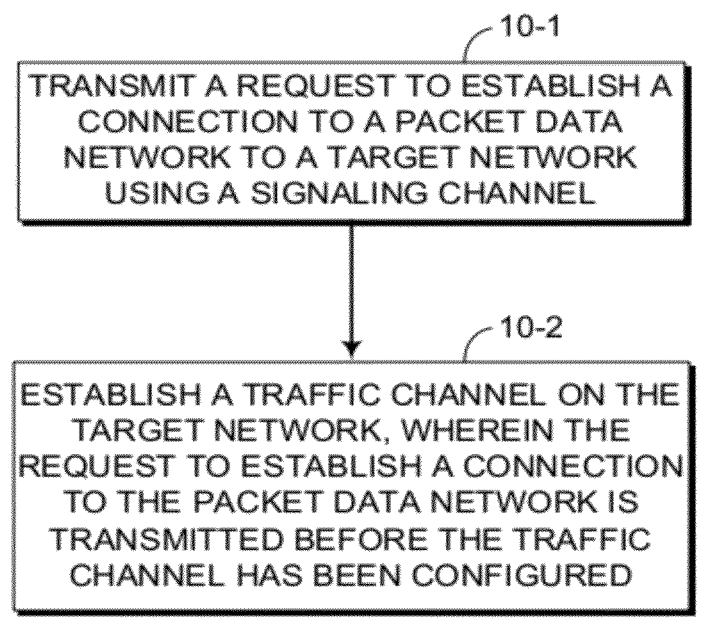
FIG. 11 shows an example illustrating a method for communicating information associated with a handoff of a wireless device from a source network to a target network.

FIG. 11 shows an example of a method for communicating information associated with a handoff of a wireless device from a source network to a target network. In block 10-1, a UE may transmit a request to establish a connection to a packet data network to a target network using a signaling channel. The request may be a VSNCP configure-request message as further described above with respect to FIG. 7B. The configure-request message may include a single configuration-option message as described above. Furthermore, the request may be a VSNCP fast-handoff-request message according to FIG. 7C. In some implementations, the request may be transmitted during a period of data inactivity, such as power up. Accordingly, the request may be transmitted in advance of the need for handoff. The signaling channel may be an access channel, for example and the request may be transmitted on the access channel using data over signaling (DoS). In block 10-2, a UE may initiate procedures to establish a traffic channel on the target network. In block 10-2, the request to establish a connection to a packet data network may be transmitted before the traffic channel has been configured.

Figure 12:
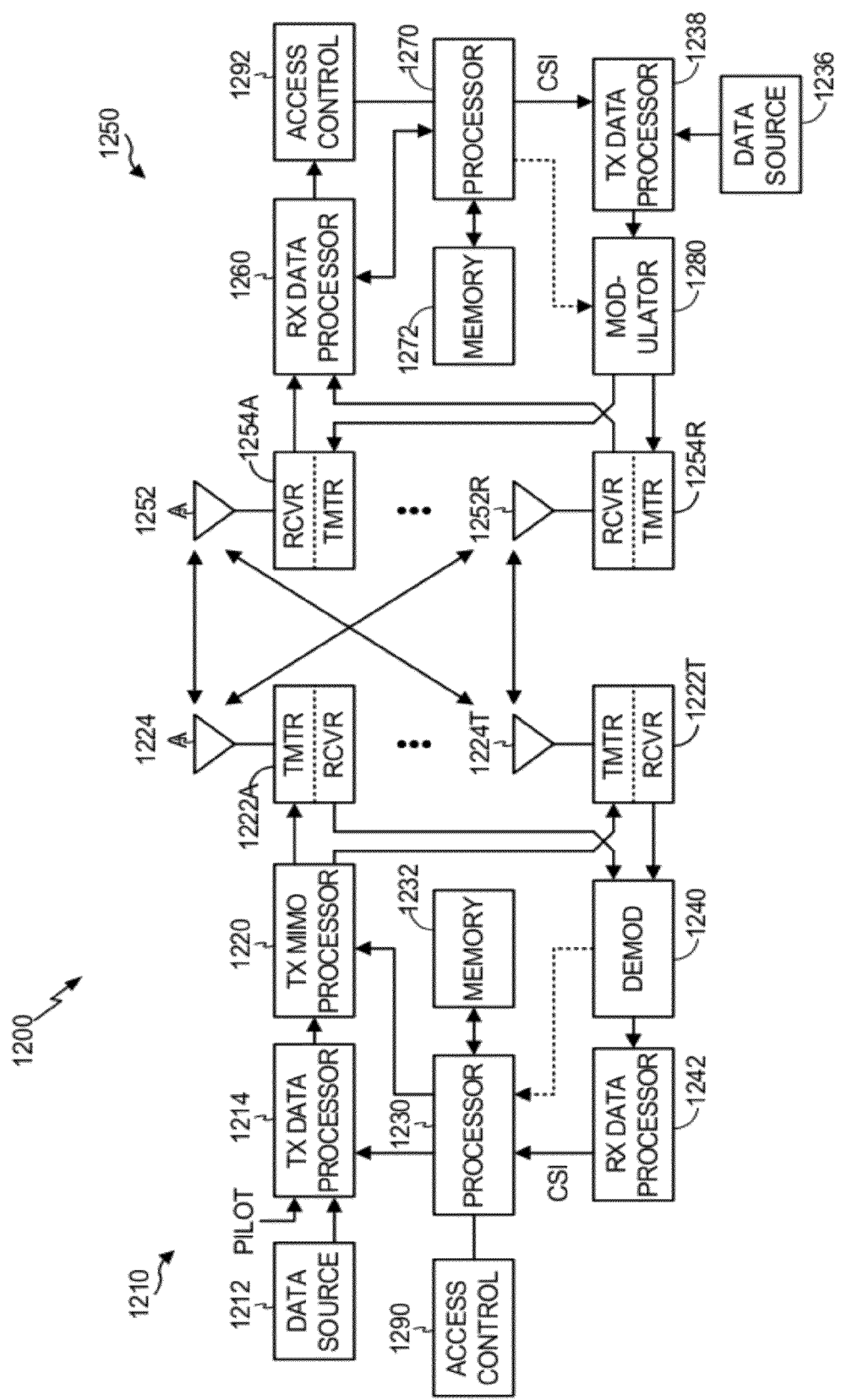
FIG. 12 shows an example of a functional block diagram of various components in a communication system.

FIG. 12 shows an example of a functional block diagram of various components in a communication system. As indicated by the systems and methods described above, the teachings herein may be incorporated into a node (e.g., a device) employing various components for communicating with at least one other node. FIG. 12 depicts several sample components that may be employed to facilitate communication between nodes. Specifically, FIG. 12 is a simplified block diagram of a first wireless device 1210 (e.g., an access point) and a second wireless device 1250 (e.g., an access terminal) of a multiple-in-multiple-out (MIMO) system 1200. At the first device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for the data streams are then provided to a TX MIMO processor 1220, which may further process the modulation symbols (e.g., for OFDM). The TX MIMO processor 1220 then provides NT modulation symbol streams to NT transceivers (XCVR) 1222A through 1222T. In some aspects, the TX MIMO processor 1220 applies beamforming weights to the symbols of the data streams and to the antenna from which the symbol is being transmitted.

Each transceiver 1222 receives and processes a respective symbol stream to provide one or more analog signals, and further conditions (e.g., amplifies, filters, and up converts) the analog signals to provide a modulated signal suitable for transmission over the MIMO channel. NT modulated signals from transceivers 1222A through 1222T are then transmitted from NT antennas 1224A through 1224T, respectively.

At the second device 1250, the transmitted modulated signals are received by NR antennas 1252A through 1252R and the received signal from each antenna 1252 is provided to a respective transceiver (XCVR) 1254A through 1254R. Each transceiver 1254 conditions (e.g., filters, amplifies, and down converts) a respective received signal, digitizes the conditioned signal to provide samples, and further processes the samples to provide a corresponding "received" symbol stream.

A receive (RX) data processor 1260 then receives and processes the NR received symbol streams from NR transceivers 1254 based on a particular receiver processing technique to provide NT "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the second device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the second device 1250 are received by the antennas 1224, conditioned by the transceivers 1222, demodulated by a demodulator (DEMOD) 1240, and processed by a RX data processor 1242 to extract the reverse link message transmitted by the second device 1250. The processor 1230 then determines which precoding matrix to use for determining the beam-forming weights then processes the extracted message.

FIG. 12 also illustrates that the communication components may include one or more components that perform access control operations as taught herein. For example, an access control component 1290 may cooperate with the processor 1230 and/or other components of the device 1210 to send/receive signals to/from another device (e.g., device 1250) as taught herein. Similarly, an access control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the access control component 1290 and the processor 1230 and a single processing component may provide the functionality of the access control component 1292 and the processor 1270. Furthermore, the components of the apparatus 1200 described with reference to FIG. 3 may be incorporated with/into the components of FIG. 12.

Figure 13:
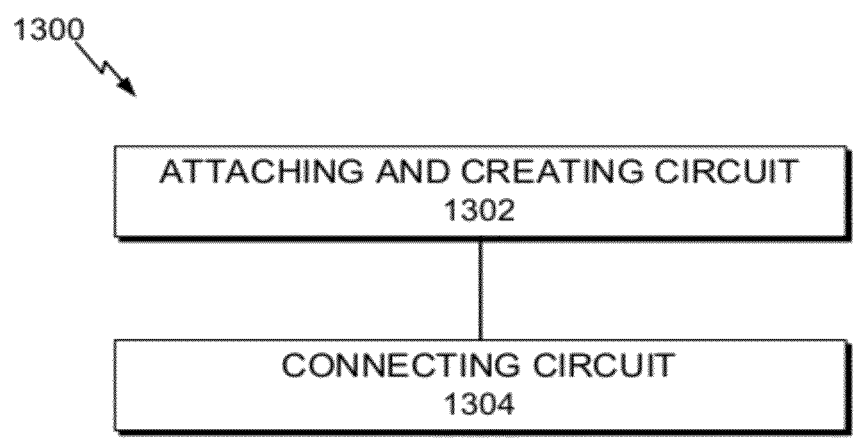
FIG. 13 shows a functional block diagram of another wireless communication device.

FIG. 13 shows a functional block diagram of another wireless communication device. Those skilled in the art will appreciate that a wireless communication device may have more components than the simplified wireless communication device 1300 shown in FIG. 13. The wireless communication device 1300 shown includes only those components useful for describing some prominent features of implementations within the scope of the claims. The wireless communication device 1300 includes an attaching and creating circuit 1302 and a connecting circuit 1304.

The attaching and creating circuit 1302 may be configured to attach and create a context with a first network during a period of data inactivity. The attaching and creating circuit 1902 may include one or more of an antenna, a transceiver, and a digital signal processor. In some implementations, the means for attaching and creating may include the attaching and creating circuit 1302.

The connecting circuit 1304 may be configured to connect to a second network based on the context created with the first network and while maintaining at least a partial context with the first network. The connecting circuit 1304 may include one or more of an antenna, transceiver, and a digital signal processor. In some implementations, the means for connecting include the connecting circuit 1304.

Figure 14:
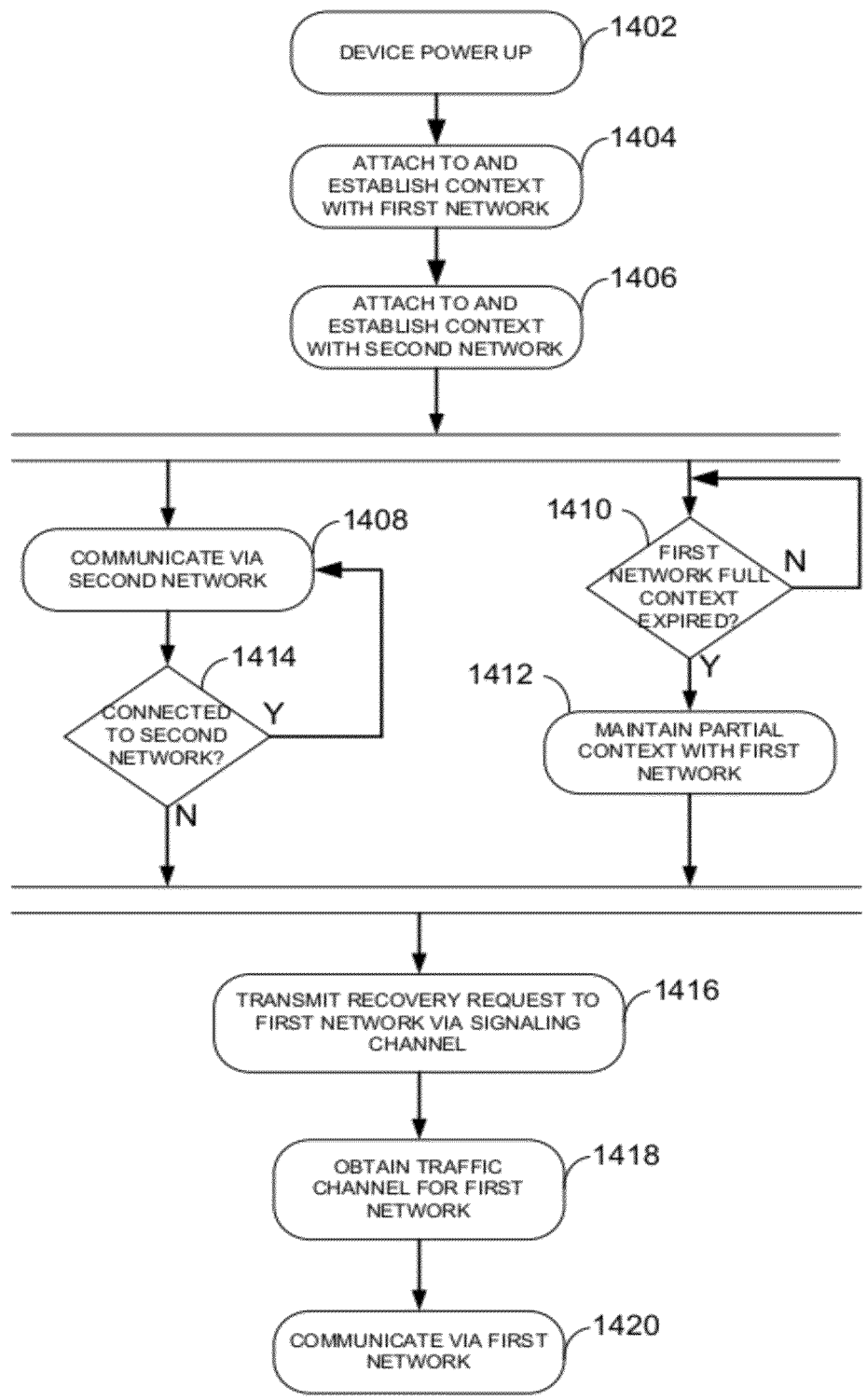
FIG. 14 shows an exemplary process flow for non-optimized handoff in a wireless communication system.

FIG. 14 shows an exemplary process flow for non-optimized handoff in a wireless communication system. An implementation of the flow may include one or more of the methods or devices described above. At a block 1402, the device which desires network access is in a period of data inactivity such as the time of power up. The device may be, for example, a mobile phone. At a block 1404, the device attaches to and establishes a context with a first network, such as an eHRPD network. The eHRPD network may not be the preferred network for the device. The device may attach and establish contexts with multiple non-preferred networks. However, for clarity, an implementation including a first non-preferred network and a second preferred network is described.

At a block 1406, the device attaches to and establishes a context with a second network, such as an LTE network. The LTE network may be a preferred network as compared to the eHRPD network. At block 1408, the device begins communications via the second network. As a device may generally have one active context, the original context with the first network is dormant. In parallel, at decision block 1410, the full context with the first network may expire. For instance, in some implementations, if the eHRPD connection is not used, all or a portion of the link may be closed to, for example, help conserve network resources. If the first network full context has not expired, the flow continues to loop, periodically checking for the expiration. If the first network full context expires, at a block 1412 a partial context is maintained with the first network. For example, a portion of the eHRPD network link to the device may be maintained, such as a link from the device, through the eHRPD access node to the HRPD gateway while the link from the gateway to and IP anchor may be closed for the device. Accordingly, the partial context may be maintained, in some implementations, by the gateway for the network (e.g., HRPD gateway).

At decision block 1414, the communications continue as long as the connection to the second network is maintained. If the decision block 1414 determines that the connection to the second network is still alive, the flow continues back to block 1410. If the decision block 1414 determines that the connection has been dropped (e.g., due to poor wireless signal conditions), the flow continue to block 1416. At block 1416, the device transmits a recovery request to the first network via a signaling channel. By using a signaling channel, the recovery process may proceed sooner than if the recovery request was sent after establishing a traffic channel with the network. At a block 1418, the traffic channel is obtained for the first network. At this point, the context for the device on the first network is recovered and the communication may continue at block 1420. Thus, the handoff from the second network to the first network is achieved in a more efficient manner than in implementations where no partial context is used. Furthermore, the handoff is achieved more efficiently than in implementations where recovering the context depends on establishing a traffic channel prior to recovering the context.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-12 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of handoff in a wireless communication system comprising:
during a period of data inactivity, attaching to a first network and creating a context therewith, the first network being a non-preferred network as compared to a second network;
connecting to the second network based on the context created with the first network and while maintaining at least a partial context with the first network;
switching to the first network from the second network based on an unavailability of the second network;
transmitting a request to establish a connection to a packet data network to the first network using a signaling channel; and
establishing a traffic channel on the first network,
wherein the request to establish a connection to the packet data network is transmitted before the traffic channel has been established, wherein the request to establish a connection to a packet data network further comprises a configuration option message, and
wherein the configuration option message comprises at least an access point name and a length of an access point name.

2. The method of claim 1, wherein the transmitting the request on the signaling channel comprises transmitting the request using data over signaling and wherein the signaling channel comprises an access channel.

3. The method of claim 1, wherein the configuration option message further comprises at least one of a configuration option type, a packet data network identifier, a user context identifier, an emergency indicator, and a bearer control mode.

4. The method of claim 1, wherein the request to establish a connection to a packet data network further comprises a vendor specific network control protocol fast handoff request message.

5. The method of claim 1, wherein the method further comprises:
transmitting a mapping of at least one packet data network identifier to at least one access point name when the partial context is established.

6. The method of claim 5, wherein creating the context comprises transmitting a request to establish a connection to a packet data network including a packet data network identifier, wherein the first network is configured to use the mapping to determine an access point name associated with the packet data network identifier.

7. The method of claim 1, wherein the second network comprises a network configured to use a long term evolution radio access technology, and wherein the first network comprises a network configured to use an evolved high rate packet data radio access technology.

8. A wireless communication apparatus operative in a communication network, the apparatus comprising:
a processor configured to:
during a period of data inactivity, attach to a first network and creating a context therewith, the first network being a non-preferred network as compared to a second network;
connect to the second network based on the context created with the first network and while maintaining at least a partial context with the first network;
switch to the first network from the second network based on an unavailability of the second network;
transmit a request to establish a connection to a packet data network to the first network using a signaling channel; and
establish a traffic channel on the first network,
wherein the request to establish a connection to the packet data network is transmitted before the traffic channel has been established,
wherein the request to establish a connection to a packet data network further comprises a configuration option message, and
wherein the configuration option message comprises at least an access point name and a length of an access point name.

9. The wireless communication apparatus of claim 8, wherein the processor is configured to transmit the request to establish a connection to the packet data network using data over signaling and wherein the signaling channel comprises an access channel.

10. The wireless communication apparatus of claim 8, wherein the configuration option message further comprises at least one of a configuration option type, a packet data network identifier, a user context identifier, an emergency indicator, and a bearer control mode.

11. The wireless communication apparatus of claim 8, wherein the request to establish a connection to a packet data network further comprises a vendor specific network control protocol fast handoff request message.

12. The wireless communication apparatus of claim 8, wherein the processor is further configured to:
transmit a mapping of at least one packet data network identifier to at least one access point name when the partial context is established.

13. The wireless communication apparatus of claim 12, wherein the request to establish a connection to a packet data network comprises a packet data network identifier, wherein the first network is configured to use the mapping to determine an access point name associated with the packet data network identifier.

14. The wireless communication apparatus of claim 8, wherein the second network comprises a network configured to use a long term evolution radio access technology, and wherein the first network comprises a network configured to use an evolved high rate packet data radio access technology.

15. A wireless communication apparatus operative in a communication network, the apparatus comprising:
means for, during a period of data inactivity, attaching to a first network and creating a context therewith, the first network being a non-preferred network as compared to a second network;
means for connecting to the second network based on the context created with the first network and while maintaining at least a partial context with the first network;
means for switching to the first network from the second network based on an unavailability of the second network;
means for transmitting a request to establish a connection to a packet data network to the first network using a signaling channel; and
means for initiating the establishment of a traffic channel on the first network,
wherein the request to establish a connection to the packet data network is transmitted before the traffic channel has been established,
wherein the request to establish a connection to a packet data network further comprises a configuration option message, and
wherein the configuration option message comprises at least an access point name and a length of an access point name.

16. The wireless communication apparatus of claim 15, wherein the means for transmitting a request to establish a connection to a packet data network further comprises means for transmitting the request using data over signaling and wherein the signaling channel comprises an access channel.

17. The wireless communication apparatus of claim 15, wherein the configuration option message further comprises at least one of a configuration option type, a packet data network identifier, a user context identifier, an emergency indicator, and a bearer control mode.

18. The wireless communication apparatus of claim 15, wherein the request to establish a connection to a packet data network further comprises a vendor specific network control protocol fast handoff request message.

19. The wireless communication apparatus of claim 15, wherein the apparatus further comprises:
means for transmitting a mapping of at least one packet data network identifier to at least one access point name when the partial context is established.

20. The wireless communication apparatus of claim 19, wherein the request to establish a connection to a packet data network comprises a packet data network identifier, wherein the target network is configured to use the mapping to determine an access point name associated with the packet data network identifier.

21. The wireless communication apparatus of claim 15, wherein the second network comprises a network configured to use a long term evolution radio access technology, and wherein the first network comprises a network configured to use an evolved high rate packet data radio access technology.

22. A computer program product, comprising:
a non-transitory computer-readable medium comprising:
code for causing a computer to, during a period of data inactivity, attach to a first network and creating a context therewith, the first network being a non-preferred network as compared to a second network;
code for causing a computer to connect to the second network based on the context created with the first network and while maintaining at least a partial context with the first network;
code for causing a computer to switch to the first network from the second network based on an unavailability of the second network;
code for causing a computer to transmit a request to establish a connection to a packet data network to the first network using a signaling channel; and
code for causing a computer to initiate the establishment of a traffic channel on the first network,
wherein the request to establish a connection to the packet data network is transmitted before the traffic channel has been established,
wherein the request to establish a connection to a packet data network further comprises a configuration option message, and
wherein the configuration option message comprises at least an access point name and a length of an access point name.

23. The computer program product of claim 22, wherein the code for causing a computer to transmit the request on the signaling channel further comprises code for transmitting the request using data over signaling and wherein the signaling channel comprises an access channel.

24. The computer program product of claim 22, wherein the configuration option message further comprises at least one of a configuration option type, a packet data network identifier, a user context identifier, an emergency indicator, and a bearer control mode.

25. The computer program product of claim 22, wherein the request to establish a connection to a packet data network further comprises a vendor specific network control protocol fast handoff request message.

26. The computer program product of claim 22, the computer readable-medium further comprising:
code for transmitting a mapping of at least one packet data network identifier to at least one access point name when the partial context is established.

27. The computer program product of claim 26, wherein the request to establish a connection to a packet data network comprises a packet data network identifier, wherein the target network is configured to use the mapping to determine an access point name associated with the packet data network identifier.

28. The computer program product of claim 22, wherein the second network comprises a network configured to use a long term evolution radio access technology, and wherein the first network comprises a network configured to use an evolved high rate packet data radio access technology.

29. A method of handoff in a wireless communication system comprising:
during a period of data inactivity, attaching to a first network and creating a context therewith, the first network being a non-preferred network as compared to a second network;
connecting to the second network based on the context created with the first network and while maintaining at least a partial context with the first network;
transmitting a mapping of at least one packet data network identifier to at least one access point name when the partial context is established;
switching to the first network from the second network based on an unavailability of the second network;
transmitting a request to establish a connection to a packet data network to the first network using a signaling channel; and
establishing a traffic channel on the first network,
wherein the request to establish a connection to the packet data network is transmitted before the traffic channel has been established.

30. A wireless communication apparatus operative in a communication network, the apparatus comprising:
a processor configured to:
during a period of data inactivity, attach to a first network and creating a context therewith, the first network being a non-preferred network as compared to a second network;
connect to the second network based on the context created with the first network and while maintaining at least a partial context with the first network;
transmit a mapping of at least one packet data network identifier to at least one access point name when the partial context is established;
switch to the first network from the second network based on an unavailability of the second network;
transmit a request to establish a connection to a packet data network to the first network using a signaling channel; and
establish a traffic channel on the first network,
wherein the request to establish a connection to the packet data network is transmitted before the traffic channel has been established.

31. A wireless communication apparatus operative in a communication network, the apparatus comprising:
means for, during a period of data inactivity, attaching to a first network and creating a context therewith, the first network being a non-preferred network as compared to a second network;
means for connecting to the second network based on the context created with the first network and while maintaining at least a partial context with the first network;
means for transmitting a mapping of at least one packet data network identifier to at least one access point name when the partial context is established;
means for switching to the first network from the second network based on an unavailability of the second network;
means for transmitting a request to establish a connection to a packet data network to the first network using a signaling channel; and
means for initiating the establishment of a traffic channel on the first network, wherein the request to establish a connection to the packet data network is transmitted before the traffic channel has been established.

32. A computer program product, comprising:

a non-transitory computer-readable medium comprising:
- code for causing a computer to, during a period of data inactivity, attach to a first network and creating a context therewith, the first network being a non-preferred network as compared to a second network;
- code for causing a computer to connect to the second network based on the context created with the first network and while maintaining at least a partial context with the first network;
- code for transmitting a mapping of at least one packet data network identifier to at least one access point name when the partial context is established;
- code for causing a computer to switch to the first network from the second network based on an unavailability of the second network;
- code for causing a computer to transmit a request to establish a connection to a packet data network to the first network using a signaling channel; and
- code for causing a computer to initiate the establishment of a traffic channel on the first network,
- wherein the request to establish a connection to the packet data network is transmitted before the traffic channel has been established.

* * * * *